United States Patent
Shiraki et al.

(10) Patent No.: US 10,714,760 B2
(45) Date of Patent: Jul. 14, 2020

(54) ELECTRODE FOR REDOX FLOW BATTERIES, REDOX FLOW BATTERY CELL, AND REDOX FLOW BATTERY

(71) Applicant: Sumitomo Electric Industries, Ltd., Osaka-shi (JP)

(72) Inventors: Kousuke Shiraki, Osaka (JP); Takashi Kanno, Osaka (JP); Kenichiro Miyatake, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 79 days.

(21) Appl. No.: 16/305,454

(22) PCT Filed: Mar. 2, 2018

(86) PCT No.: PCT/JP2018/008167
§ 371 (c)(1),
(2) Date: Nov. 29, 2018

(87) PCT Pub. No.: WO2019/167283
PCT Pub. Date: Sep. 6, 2019

(65) Prior Publication Data
US 2019/0273264 A1    Sep. 5, 2019

(51) Int. Cl.
*H01M 4/86* (2006.01)
*H01M 4/04* (2006.01)
*H01M 8/18* (2006.01)
*H01M 4/96* (2006.01)

(52) U.S. Cl.
CPC ....... *H01M 4/8631* (2013.01); *H01M 4/0471* (2013.01); *H01M 4/96* (2013.01); *H01M 8/188* (2013.01); *H01M 2004/8694* (2013.01)

(58) Field of Classification Search
CPC .... H01M 4/8631; H01M 4/0471; H01M 4/96; H01M 8/185
See application file for complete search history.

(56) References Cited

U.S. PATENT DOCUMENTS

| | | | | |
|---|---|---|---|---|
| 4,925,604 A | * | 5/1990 | Ohsaki | D01F 6/18 264/182 |
| 2020/0002850 A1 | * | 1/2020 | Matsuyama | D01D 5/0046 |

FOREIGN PATENT DOCUMENTS

| | | |
|---|---|---|
| JP | H08-287923 A | 11/1996 |
| JP | 2001-085025 A | 3/2001 |
| JP | 2013-232434 A | 11/2013 |
| JP | 2015-190066 A | 11/2015 |

* cited by examiner

*Primary Examiner* — Helen Oi K Conley
(74) *Attorney, Agent, or Firm* — Baker Botts L.L.P.; Michael A. Sartori

(57) ABSTRACT

An electrode for redox flow batteries, the electrode being formed of a carbon fiber aggregate including a plurality of carbon fibers. Each of the carbon fibers has a plurality of pleats formed in the surface thereof. The ratio of $L_1$ to $L_2$, that is, $L_1/L_2$, is more than 1, where $L_1$ is the peripheral length of a cross section of the carbon fibers and $L_2$ is the peripheral length of a virtual rectangle circumscribing the cross section of the carbon fibers.

7 Claims, 4 Drawing Sheets

ELECTRODE FOR REDOX FLOW BATTERIES, REDOX FLOW BATTERY CELL, AND REDOX FLOW BATTERY

TECHNICAL FIELD

The present invention relates to an electrode for redox flow batteries, a redox flow battery cell, and a redox flow battery.

BACKGROUND ART

A redox flow battery (hereinafter, may be referred to as "RF battery") is one of the known large-capacity storage batteries (e.g., see PTLs 1 and 2). RF batteries commonly include a cell stack constituted by a plurality of sets of a cell frame, a positive electrode, a membrane, and a negative electrode which are stacked on top of one another. The cell frame includes a bipolar plate interposed between the positive electrode and the negative electrode and a frame body disposed on the periphery of the bipolar plate. In the cell stack, two bipolar plates of a pair of adjacent cell frames and positive and negative electrodes interposed between the bipolar electrodes with a membrane being interposed between the electrodes form a cell. An RF battery performs charge and discharge by circulating electrolytes through the cells that include the electrodes.

The electrodes of a redox flow battery serve as a reaction field that promotes the cell reaction of an active material (metal ions) included in the electrolytes. Carbon fiber aggregates that include carbon fibers (e.g., carbon felt) have been commonly used for producing the electrodes for redox flow batteries. The carbon fibers are typically PAN-based carbon fibers produced using polyacrylonitrile (PAN) fibers as a raw material (e.g., see PTLs 2 to 4).

CITATION LIST

Patent Literature

PTL 1: Japanese Unexamined Patent Application Publication No. 2013-232434
PTL 2: Japanese Unexamined Patent Application Publication No. 2015-190066
PTL 3: Japanese Unexamined Patent Application Publication No. 8-287923
PTL 4: Japanese Unexamined Patent Application Publication No. 2001-85025

SUMMARY OF INVENTION

An electrode for redox flow batteries according to the present disclosure is an electrode for redox flow batteries, the electrode being formed of a carbon fiber aggregate including a plurality of carbon fibers, each of the carbon fibers having a plurality of pleats formed in the surface thereof, the ratio of $L_1$ to $L_2$, that is, $L_1/L_2$, being more than 1, where $L_1$ is the peripheral length of a cross section of the carbon fibers and $L_2$ is the peripheral length of a virtual rectangle circumscribing the cross section of the carbon fibers.

A redox flow battery cell according to the present disclosure includes the above-described electrode for redox flow batteries according to the present disclosure.

A redox flow battery according to the present disclosure includes the above-described redox flow battery cell according to the present disclosure.

DESCRIPTION OF EMBODIMENTS

Figure 1:
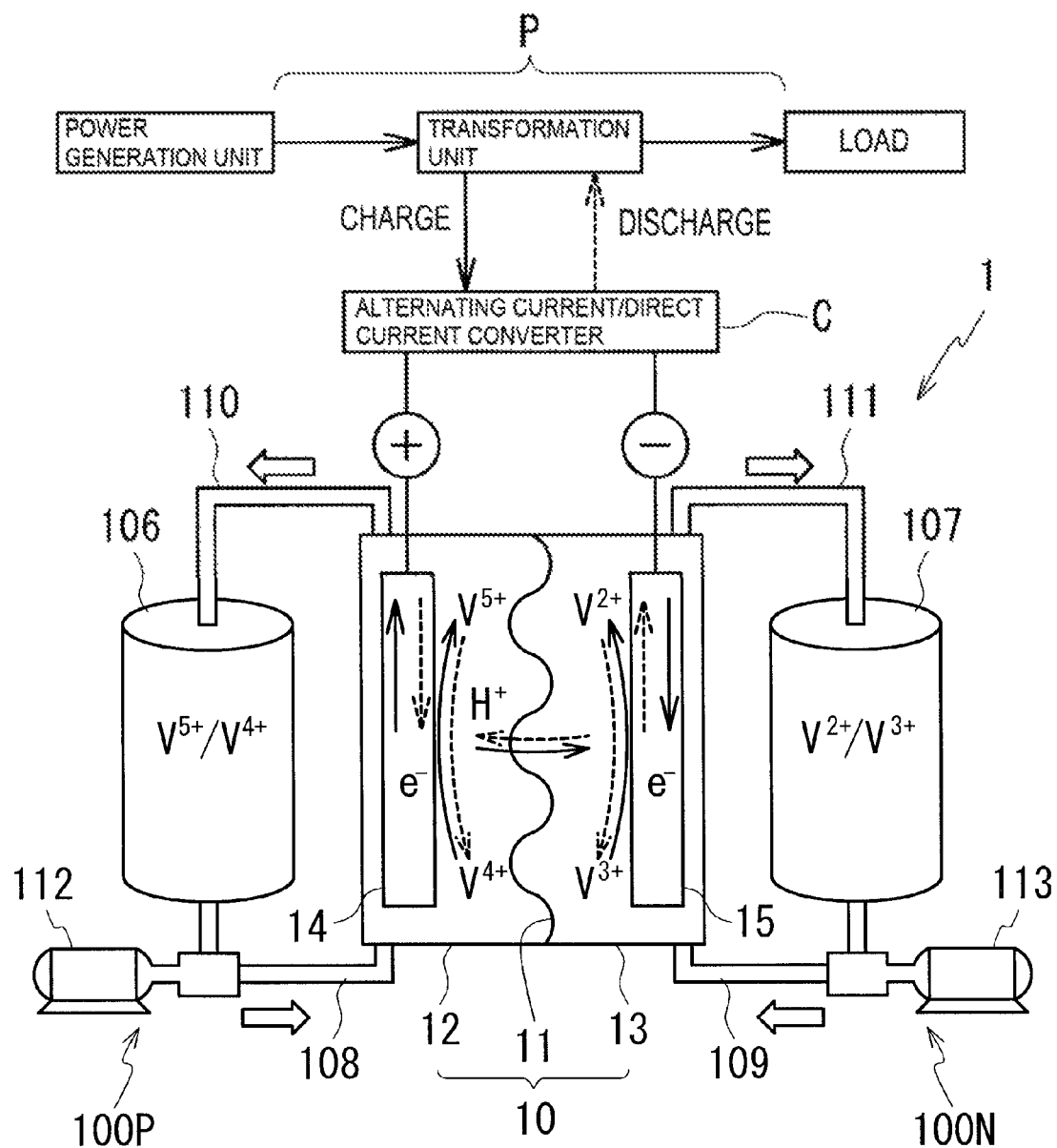
FIG. 1 is a diagram illustrating the principle of operation of a redox flow battery according to an embodiment.

Problems to be Solved by the Disclosure

There has been a demand for improvement in the battery performance of redox flow batteries.

The carbon fiber aggregate used for producing an electrode for redox flow batteries have been commonly composed of circular cross-section carbon fibers having a substantially circular cross section (the cross section of the fibers which is orthogonal to the longitudinal direction of the fibers).

One of the methods for improving the battery performance of a redox flow battery is to reduce the reaction resistance of electrodes. Since the carbon fibers that have been used for producing electrodes formed of the carbon fiber aggregate have a circular cross section, the reaction area of electrodes at which the electrodes come into contact with electrolytes is small. Therefore, it has been difficult to reduce the reaction resistance of the electrodes.

Accordingly, it is an object of the present disclosure to provide an electrode for redox flow batteries with which the reaction resistance of electrodes can be reduced. Another object of the present disclosure is to provide a redox flow battery cell and a redox flow battery that have excellent battery performance.

Advantages of the Disclosure

The present disclosure provides an electrode for redox flow batteries capable of reducing the reaction resistance of electrodes. The present disclosure also provides a redox flow battery cell and a redox flow battery that have excellent battery performance.

DESCRIPTION OF THE EMBODIMENTS OF THE INVENTION

The inventors of the present invention proposes using modified cross-section carbon fibers each of which having a plurality of pleats formed in the surface thereof for producing an electrode formed of the carbon fiber aggregate. This increases the specific surface area of the fibers and the reaction area of the electrode at which the electrode comes into contact with an electrolyte and, consequently, enhances the reactivity of the electrode with the electrolyte. As a result, the reaction resistance of the electrode can be reduced, and the battery performance can be enhanced.

The embodiments of the present invention are listed below.

(1) An electrode for redox flow batteries according to an embodiment is an electrode for redox flow batteries, the electrode being formed of a carbon fiber aggregate including a plurality of carbon fibers, each of the carbon fibers having a plurality of pleats formed in the surface thereof, the ratio of $L_1$ to $L_2$, that is, $L_1/L_2$, being more than 1, where $L_1$ is the peripheral length of a cross section of the carbon fibers and $L_2$ is the peripheral length of a virtual rectangle circumscribing the cross section of the carbon fibers.

Since the above-described electrode for redox flow batteries is formed of a carbon fiber aggregate, the electrode has voids formed therein, which enable an electrolyte to pass through the electrode and permeate and diffuse into the electrode. This increases the reaction region in which the electrode reacts with the electrolyte and makes it easy to maintain the reaction field. Moreover, since the carbon fibers constituting the carbon fiber aggregate have a plurality of pleats formed in the surfaces thereof, the fibers have a large surface area. This increases the reaction area of electrode at which the electrode comes into contact with an electrolyte and, consequently, improves the reactivity of the electrode with the electrolyte. Specifically, since the ratio $L_1/L_2$ of the peripheral length ($L_1$) of a cross section of the carbon fibers to the peripheral length ($L_2$) of a virtual rectangle circumscribing the cross section of the carbon fibers is more than 1, the fibers have a large specific surface area. This enables a sufficiently large reaction area of the electrode, at which the electrode comes into contact with an electrolyte, to be maintained and enhances the reactivity of the electrode with the electrolyte. Accordingly, the electrode for redox flow batteries is capable of reducing the reaction resistance of electrodes. As for the upper limit for the ratio $L_1/L_2$, the ratio $L_1/L_2$ is limited to be, for example, 2 or less.

Figure 4:
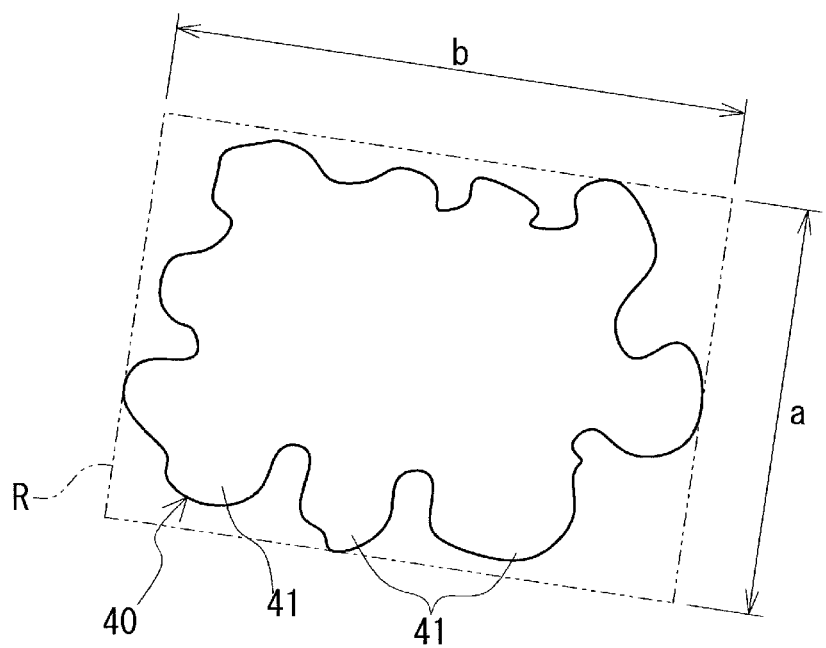
FIG. 4 is a schematic cross-sectional view of a carbon fiber that constitutes an electrode for redox flow batteries according to an embodiment.

The term "cross section of the carbon fibers" used herein refers to a cross section of the fibers which is orthogonal to the longitudinal direction of the fibers. The virtual rectangle circumscribing a cross section of carbon fibers is determined as follows. The outline of a cross section of a carbon fiber 40 is determined as illustrated in FIG. 4. A pair of parallel lines between which the outline of the fiber 40 is sandwiched such that the interval between the parallel lines is minimum is determined. Subsequently, another pair of parallel lines that are perpendicular to the above pair of the parallel lines and between which the outline of the fiber 40 is sandwiched such that the interval between the other pair of parallel lines is maximum is determined. A rectangle defined by the two pairs of the parallel lines is a virtual rectangle R. The length of the minor axis of the carbon fiber 40 is the length a of the short side of the virtual rectangle R. The length of the major axis of the carbon fiber 40 is the length b of the long side of the virtual rectangle R.

(2) In the electrode for redox flow batteries according to the embodiment, the ratio of $S_1$ to $S_2$, that is, $S_1/S_2$, may be 0.5 or more and 0.8 or less, where $S_1$ is the area of a cross section of the carbon fibers and $S_2$ is the area of a virtual rectangle circumscribing the cross section of the carbon fibers.

When the ratio $S_1/S_2$ of the area ($S_1$) of a cross section of the carbon fibers to the area ($S_2$) of a virtual rectangle circumscribing the cross section of the carbon fibers is 0.5 or more, a sufficiently high strength of the carbon fibers is readily maintained and a reduction in the strength of electrodes can be limited. The higher (the closer to 1) the ratio $S_1/S_2$, the larger the proportion of the cross section of the fiber to the virtual rectangle and the higher the strength of the fiber. However, an increase in the ratio $S_1/S_2$ narrows the gaps formed between the pleats and reduces the likelihood of an electrolyte entering the gaps formed between the pleats. Consequently, it becomes difficult to increase the reaction area of the electrode at which the electrode comes into contact with the electrolyte. When the ratio $S_1/S_2$ is 0.8 or less, sufficiently large gaps may be readily maintained between the pleats and the reduction in the likelihood of an electrolyte entering the gaps formed between the pleats may be limited. Accordingly, when the ratio $S_1/S_2$ is limited to be 0.5 or more and 0.8 or less, the reaction area of electrodes at which the electrodes come into contact with an electrolyte can be maintained while the strength of the fibers is maintained.

(3) In the electrode for redox flow batteries according to the embodiment, the length of the major axis of the carbon fibers may be 5 μm or more and 20 μm or less.

When the length of the major axis of the carbon fibers is 5 μm or more, the strength of the fibers can be readily maintained and a reduction in the strength of electrodes can be limited. When the length of the major axis of the carbon fibers is 20 μm or less, the fibers are thin and flexible. When the fibers are flexible, the likelihood of the fibers sticking into a membrane included in the redox flow battery cell can be reduced. The term "the length of the major axis of the carbon fibers" used herein refers to, as described above, the length b of the long side of the virtual rectangle R circumscribing a cross section of the fibers (see FIG. 4).

(4) In the electrode for redox flow batteries according to the embodiment, the carbon fibers may have a Young's modulus of 20 GPa or more and 200 GPa or less.

When the Young's modulus of the carbon fibers is 20 GPa or more, the fibers have high flexural rigidity, which reduces the likelihood of the electrode becoming damaged when the electrode is deformed by compression. When the Young's modulus of the carbon fibers is 200 GPa or less, the likelihood of the fibers sticking into a membrane included in the redox flow battery cell can be reduced.

(5) In the electrode for redox flow batteries according to the embodiment, the carbon fiber aggregate may be carbon felt or carbon cloth.

Specific examples of the carbon fiber aggregate include carbon felt (nonwoven fabric made of carbon fibers) and carbon cloth (woven fabric made of carbon fibers), which are produced using carbon fibers; and carbon paper (carbon fiber-carbon composite material) synthesized using carbon fibers and carbon. Among these, carbon felt and carbon cloth have gaps formed between the fibers and a relatively high porosity. Therefore, using carbon felt or carbon cloth as an electrode material facilitates the circulation of an electrolyte and permeation and diffusion of the electrolyte into the electrode. It is particularly preferable to use carbon felt in order to readily diffuse the electrolyte to the entirety of the electrode, because carbon felt is composed of randomly oriented carbon fibers.

Specific examples of the carbon fibers include PAN-based carbon fibers produced using PAN fibers, pitch-based carbon fibers produced using pitch fibers, and rayon-based carbon fibers produced using rayon fibers.

(6) A redox flow battery cell according to an embodiment includes the electrode for redox flow batteries described in any one of (1) to (5) above.

Since the redox flow battery cell includes the above-described electrode for redox flow batteries according to an embodiment, the redox flow battery cell is capable of reducing the reaction resistance of electrodes and enhancing the battery performance.

(7) A redox flow battery according to an embodiment includes
the redox flow battery cell described in (6) above.

Since the redox flow battery includes the redox flow battery cell according to the above embodiment, the redox flow battery is capable of reducing the reaction resistance of electrodes and enhancing the battery performance. Thus, the redox flow battery has excellent battery performance.

DETAILS OF THE EMBODIMENTS OF THE INVENTION

Specific examples of the electrode for redox flow batteries (hereinafter, may be referred to simply as "electrode"), the redox flow battery cell (hereinafter, may be referred to simply as "cell"), and the redox flow battery (RF battery) according to an embodiment of the present invention are described below with reference to the attached drawings. In the drawings, the same or equivalent components are denoted by the same reference numeral. It is intended that the scope of the present invention be not limited by the following examples, but determined by the appended claims, and include all modifications and variations that are equivalent to or fall within the scope of the invention.

<<RF Battery>>

Figure 2:
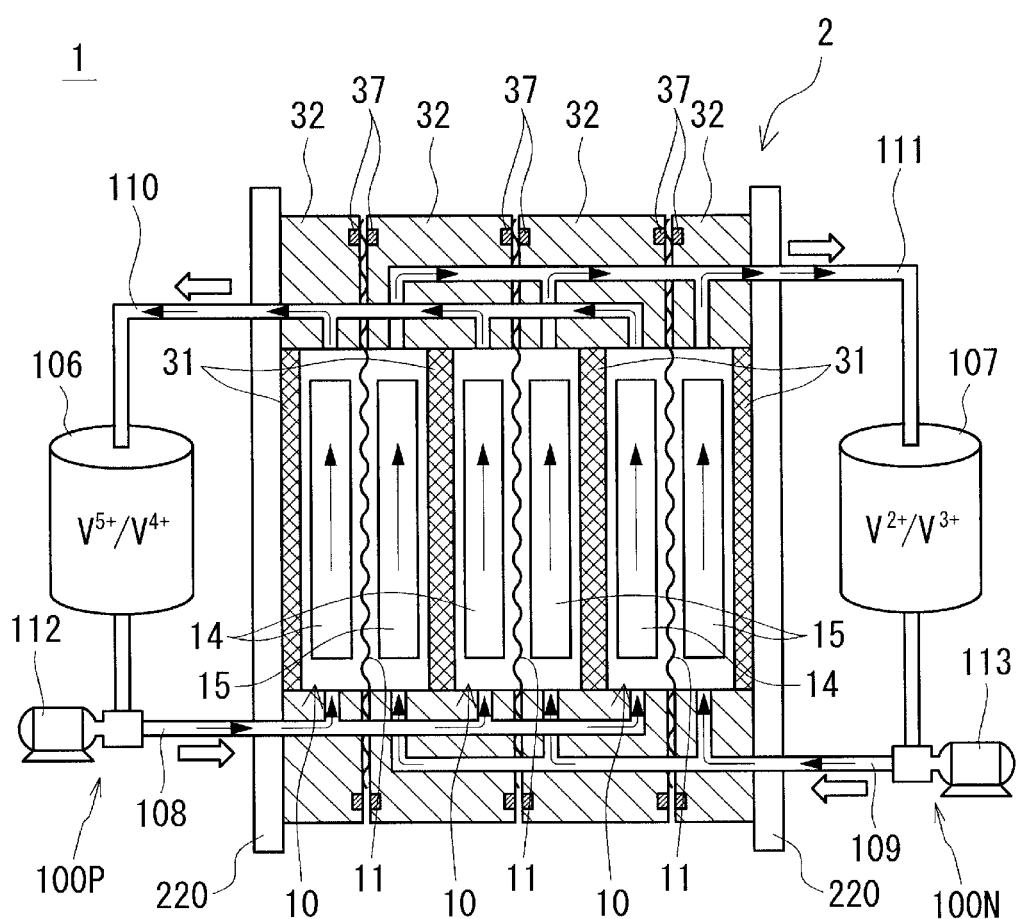
FIG. 2 is a schematic diagram illustrating an example of a redox flow battery according to an embodiment.

First, an example of an RF battery 1 and an example of a cell 10 included in the RF battery 1 according to an embodiment are described below with reference to FIGS. 1 to 3. The RF battery 1 illustrated in FIGS. 1 and 2 includes an electrolyte containing an active material that is a metal ion the valence of which varies due to oxidation and reduction, the electrolyte serving as a positive electrolyte and a negative electrolyte, and performs charge and discharge by utilizing the difference in oxidation reduction potential between the ion contained in the positive electrolyte and the ion contained in the negative electrolyte. The example of the RF battery 1 illustrated in the drawings is a vanadium-based RF battery including a vanadium electrolyte containing V ions which serves as a positive electrolyte and a negative electrolyte. In FIG. 1, the solid arrows in the cell 10 show the charge reaction, while the dashed arrows show the discharge reaction. The RF battery 1 is connected to a power system P with an alternating current/direct current converter C and used for, for example, load levelling purpose, instantaneous voltage drop compensation, or as an emergency power source. The RF battery 1 may be used also for power levelling purpose in natural energy power generation, such as photovoltaic power generation or wind power generation.

The RF battery 1 includes a cell 10 that performs charge and discharge, tanks 106 and 107 that store an electrolyte, and circulation channels 100P and 100N through which the electrolyte is circulated between the tank 106 or 107 and the cell 10.

<<Cell>>

As illustrated in FIG. 1, the cell 10 includes a positive electrode 14, a negative electrode 15, and a membrane 11 interposed between the electrodes 14 and 15. As for the structure of the cell 10, the cell 10 is divided into a positive electrode cell 12 and a negative electrode cell 13 by the membrane 11. The positive electrode cell 12 includes a positive electrode 14 disposed therein. The negative electrode cell 13 includes a negative electrode 15 disposed therein.

Each of the electrodes, that is, the positive electrode 14 and the negative electrode 15, is formed of a carbon fiber aggregate including carbon fibers which is any of carbon felt, carbon cloth, carbon paper, and the like. Examples of the carbon fibers include PAN-based carbon fibers, pitch-based carbon fibers, and rayon-based carbon fibers. The membrane 11 is formed of, for example, an ion-exchange membrane permeable to hydrogen ions. The carbon fibers constituting the carbon fiber aggregate are detailed below.

Electrolytes (a positive electrolyte and a negative electrolyte) circulate through the cell 10 (the positive electrode cell 12 and the negative electrode cell 13) and the circulation channels 100P and 100N. The positive electrode cell 12 is connected to a positive electrolyte tank 106 that stores the positive electrolyte with the positive electrolyte circulation channel 100P. Similarly, the negative electrode cell 13 is connected to a negative electrolyte tank 107 that stores the negative electrolyte with the negative electrolyte circulation channel 100N. The circulation channel 100P includes a supply pipe 108 through which the electrolyte is transported from the tank 106 to the cell 10 and a return pipe 110 through which the electrolyte is returned from the cell 10 to the tank 106. The circulation channel 100N includes a supply pipe 109 through which the electrolyte is transported from the tank 107 to the cell 10 and a return pipe 111 through which the electrolyte is returned from the cell 10 to the tank 107. The supply pipe 108 is provided with a pump 112 disposed therein, which is used for pressure feed of the electrolyte stored in the tank 106. The supply pipe 109 is provided with a pump 113 disposed therein, which is used for pressure feed of the electrolyte stored in the tank 107. The electrolytes are circulated through the cell 10 with the pumps 112 and 113.

<<Cell Stack>>

The cell 10 may have a single-cell structure that includes only one cell 10 or a multi-cell structure that includes a plurality of cells 10. Normally, the cell 10 is used in the form of "cell stack" 2 as illustrated in FIG. 2, which includes a plurality of the cells 10 stacked on top of one another. As illustrated in the lower diagram of FIG. 3, the cell stack 2 includes substacks 200, two end plates 220 between which the substacks 200 are sandwiched, and a clamping mechanism 230 with which the end plates disposed at the respective ends are clamped together. FIG. 3 illustrates a cell stack 2 including a plurality of substacks 200 as an example. Each of the substacks 200 includes a plurality of sets of a cell frame 3, a positive electrode 14, a membrane 11, and a negative electrode 15 that are stacked on top of one another in this order (see the upper diagram of FIG. 3) and two supply and discharge plates 210 disposed on the respective ends of the multilayer body (see the lower diagram of FIG. 3; not illustrated in FIG. 2). The supply and discharge plates 210 are connected to the supply pipes 108 and 109 and the return pipes 110 and 111 of the circulation channels 100P and 100N (see FIGS. 1 and 2).

(Cell Frame)

Figure 3:
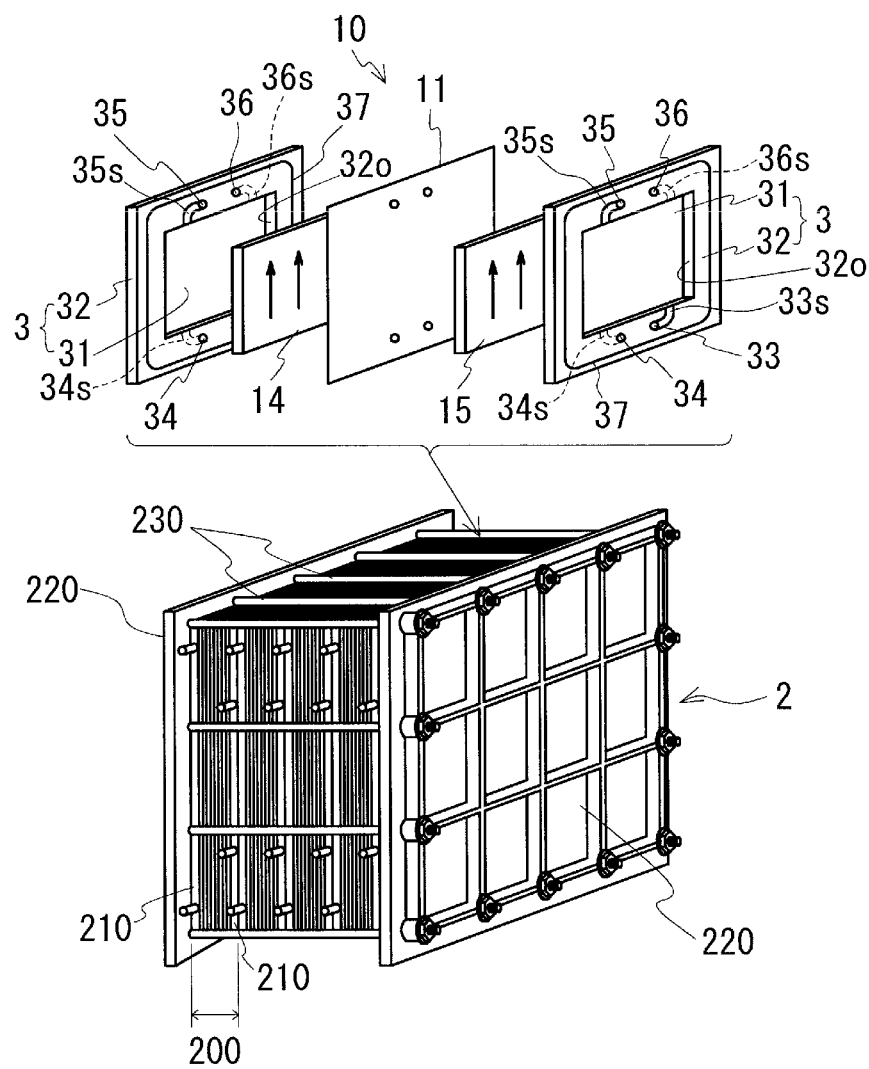
FIG. 3 is a schematic diagram illustrating an example of a cell stack.

The cell frame 3 includes a bipolar plate 31 interposed between the positive electrode 14 and the negative electrode 15 and a frame body 32 disposed on the periphery of the bipolar plate 31, as illustrated in the upper diagram of FIG. 3. The positive electrode 14 is disposed on one of the surfaces of the bipolar plate 31. The negative electrode 15 is disposed on the other surface of the bipolar plate 31. The bipolar plate 31 is disposed inside the frame body 32. The bipolar plate 31 and the frame body 32 define recesses 32o. The recesses 32o are formed on the respective sides of the bipolar plate 31. Each of the recesses 32o houses the positive electrode 14 and the negative electrode 15 with the bipolar plate 31 being interposed therebetween. Each of the recesses 32o forms a cell space, that is, the positive electrode cell 12 or the negative electrode cell 13 (see FIG. 1).

The bipolar plate 31 is composed of, for example, plastic containing carbon. The frame body 32 is composed of, for example, a plastic such as a vinyl chloride resin (PVC), polypropylene, polyethylene, a fluororesin, or an epoxy resin. The cell frame 3 is produced by forming the frame body 32 on the periphery of the bipolar plate 31 by injection molding or the like in an integrated manner.

In the cell stack 2 (the substacks 200), one of the surfaces of the frame body 32 of a cell frame 3 and the other surface of the frame body 32 of an adjacent cell frame 3 are brought into contact with each other so as to face each other to form a cell 10 between the two bipolar plates 31 of the adjacent cell frames 3. When the assembly of the cell 10 is completed, the electrodes 14 and 15 are housed in each of the recesses 32o of the frame bodies 32 while being compressed in the thickness direction. The depth of the recesses 32o determines the thickness of the electrodes 14 and 15 that are in compression. Ring-shaped sealing members 37, such as O-rings or flat gaskets, are interposed between the frame bodies 32 of each pair of adjacent cell frames 3 in order to prevent the leakage of the electrolyte. The frame body 32 is provided with sealing grooves (not illustrated) formed therein, in which the sealing members 37 are to be disposed.

The electrolytes are circulated through the cell 10 by using liquid-supply manifolds 33 and 34 and liquid-discharge manifolds 35 and 36 that are formed in the frame body 32 of the cell frame 3 so as to penetrate through the frame body 32 and liquid-supply slits 33s and 34s and liquid-discharge slits 35s and 36s formed in the frame body 32. In the cell frame 3 (the frame body 32) illustrated in this example, the positive electrolyte is fed from the liquid-supply manifold 33 formed in the lower portion of the frame body 32 to the positive electrode 14 through the liquid-supply slit 33s formed in one of the surfaces of the frame body 32 and then discharged to the liquid-discharge manifold 35 through the liquid-discharge slit 35s formed in the upper portion of the frame body 32. Similarly, the negative electrolyte is fed from the liquid-supply manifold 34 formed in the lower portion of the frame body 32 to the negative electrode 15 through the liquid-supply slit 34s formed in the other surface of the frame body 32 and then discharged to the liquid-discharge manifold 36 through the liquid-discharge slit 36s formed in the upper portion of the frame body 32. The liquid-supply manifolds 33 and 34 and the liquid-discharge manifolds 35 and 36 form channels for electrolytes when a plurality of the cell frames 3 are stacked on top of one another. The channels are communicated with the supply pipes 108 and 109 and the return pipes 110 and 111 of the circulation channels 100P and 100N (see FIGS. 1 and 2) through the supply and discharge plates 210 (see the lower diagram of FIG. 3) and thereby enable the electrolytes to circulate through the cell 10.

In the cell 10 illustrated in this example, the electrolytes are fed from the lower parts of the positive electrode 14 and the negative electrode 15 and discharged from the upper parts of the electrodes 14 and 15. That is, the electrolytes flow in the direction from the lower ends to the upper ends of the electrodes 14 and 15. In FIG. 2 and the upper diagram of FIG. 3, the arrows in the electrodes 14 and 15 show the direction in which the electrolyte generally flows.

(Bipolar Plate)

A channel (not illustrated) that includes a plurality of grooves through which the electrolyte flows may be formed in the surfaces of the bipolar plate 31 which face the electrode 14 or 15. In such a case, the resistance to the flow of the electrolyte through the cell 10 can be reduced and, accordingly, the pressure loss of the electrolyte in the cell 10 can be reduced. The width and the depth of the grooves may be selected adequately in accordance with the size and thickness of the bipolar plate 31 and are not limited.

(Electrode)

The electrodes (the positive electrode 14 and the negative electrode 15) according to the embodiment are formed of a carbon fiber aggregate that includes a plurality of carbon fibers. Since the electrodes formed of the carbon fiber aggregate is porous and have voids formed in the electrodes, the electrolyte can pass through the electrodes and permeate and diffuse into the electrodes. This increases the reaction region of the electrodes in which the electrodes react with the electrolyte and enables the reaction field to be readily maintained. Typical examples of the carbon fiber aggregate include carbon felt, carbon cloth, and carbon paper. Among these, carbon felt and carbon cloth have a relatively high porosity. Therefore, using carbon felt or carbon cloth as an electrode material facilitates the circulation of the electrolyte and permeation and diffusion of the electrolyte into the electrodes. It is particularly preferable to use carbon felt in order to readily diffuse the electrolyte to the entirety of the electrodes, because carbon felt is composed of randomly oriented carbon fibers. Typical examples of the carbon fibers include PAN-based carbon fibers, pitch-based carbon fibers, and rayon-based carbon fibers.

One of the features of the electrodes according to the embodiment is that a carbon fiber 40 constituting the carbon fiber aggregate has a plurality of pleats 41 formed in the surface thereof, as illustrated in FIG. 4.

(Carbon Fiber)

The carbon fiber 40 is a modified cross-section fiber having a plurality of pleats 41 formed in the surface thereof and has pleat-like irregularities formed in the surface. Since the carbon fiber 40 has a plurality of the pleats 41 formed in the surface, the fiber 40 has a large surface area. This increases the reaction area of electrodes at which the electrodes come into contact with the electrolyte and, consequently, improves the reactivity of the electrodes with the electrolyte.

<Peripheral Length Ratio $L_1/L_2$>

The ratio of $L_1$ to $L_2$, that is, $L_1/L_2$, is more than 1, where $L_1$ is the peripheral length of a cross section of the carbon fiber 40 and $L_2$ is the peripheral length of a virtual rectangle R circumscribing the cross section of the carbon fiber 40.

When the peripheral length ratio $L_1/L_2$ is more than 1, a sufficiently large reaction area of electrodes, at which the electrodes come into contact with the electrolyte, can be maintained and, consequently, the reactivity of the electrodes with the electrolyte can be enhanced. Since the surface area of the carbon fiber 40 is proportional to the peripheral length $L_1$, the higher the ratio $L_1/L_2$, the larger the specific surface area of the fiber 40 and the larger the reaction area of electrodes at which the electrodes come into contact with the electrolyte. Accordingly, the ratio $L_1/L_2$ is preferably 1.1 or more. However, if the ratio $L_1/L_2$ is excessively high, the number of the pleats 41 becomes excessively large. In such a case, the pleats 41 may adhere to one another, and the gaps between the pleats 41 may be reduced disadvantageously. As a result, it becomes difficult for the electrolyte to enter the gaps between the pleats 41 and the reaction area of electrodes at which the electrodes react with the electrolyte may fail to be increased. As for the upper limit for the ratio $L_1/L_2$, the ratio $L_1/L_2$ is limited to be, for example, 2 or less. This enables sufficiently large gaps to be maintained between the pleats 41 and increases the likelihood of the electrolyte entering the gaps between the pleats 41. As for the upper limit for the ratio $L_1/L_2$, the ratio $L_1/L_2$ is preferably 1.8 or less, is further preferably 1.6 or less, and is particularly preferably 1.4 or less.

The method for determining the virtual rectangle R circumscribing a cross section of the carbon fiber 40 is described below specifically with reference to FIG. 4. First, a cross section of the electrode is inspected with an optical microscope, a scanning electrophotographic microscope (SEM), or the like. The outline of a cross section of the carbon fiber 40 (a cross section orthogonal to the longitudinal direction of the fiber) is extracted from the cross-sectional image. A pair of parallel lines between which the outline of the fiber 40 is sandwiched such that the interval between the parallel lines is minimum is determined. Subsequently, another pair of parallel lines that are perpendicular to the above pair of the parallel lines and between which the outline of the fiber 40 is sandwiched such that the interval between the other pair of parallel lines is maximum is determined. A rectangle defined by the two pairs of the parallel lines is the virtual rectangle R. The length of the minor axis of the carbon fiber 40 is the length a of the short side of the virtual rectangle R. The length of the major axis of the carbon fiber 40 is the length b of the long side of the virtual rectangle R.

The peripheral length $L_1$ of a cross section of the carbon fiber 40 can be determined by analyzing the cross-sectional image. In this embodiment, the ratio of the peripheral length $L_1$ of a cross section of the carbon fiber 40 to the peripheral length $L_2$ of a virtual rectangle R circumscribing the cross section of the carbon fiber 40, that is, peripheral length ratio $L_1/L_2$, is determined as follows. The peripheral length $L_1$ of a cross section of each of a plurality of carbon fibers is measured. The virtual rectangle R of the cross section of each of the fibers is determined, and the peripheral length $L_2$ of the virtual rectangle R is measured. The ratios $L_1/L_2$ of the fibers are calculated and averaged. The number of fibers to be measured is, for example, 3 or more and is further preferably 5 or more.

It is preferable that the carbon fiber 40 satisfy the following conditions.

<Area Ratio $S_1/S_2$>

The ratio of $S_1$ to $S_2$, that is, $S_1/S_2$, is 0.5 or more and 0.8 or less, where $S_1$ is the area of a cross section of the carbon fiber 40 and $S_2$ is the area of a virtual rectangle R circumscribing the cross section of the carbon fiber 40.

When the area ratio $S_1/S_2$ is 0.5 or more, a sufficiently high strength of the carbon fiber 40 can be maintained readily and, consequently, a reduction in the strength of the electrodes can be limited. The higher (the closer to 1) the ratio $S_1/S_2$, the larger the proportion of the cross section of the fiber 40 to the virtual rectangle R and, therefore, the higher the strength of the fiber. However, an increase in the ratio $S_1/S_2$ may narrow the gaps formed between the pleats 41 and reduces the likelihood of the electrolyte entering the gaps formed between the pleats 41. Consequently, it may become difficult to increase the reaction area of electrodes at which the electrodes come into contact with the electrolyte. When the ratio $S_1/S_2$ is 0.8 or less, sufficiently large gaps may be maintained between the pleats 41 and the reduction in the likelihood of the electrolyte entering the gaps formed between the pleats 41 may be limited. Accordingly, when the ratio $S_1/S_2$ is limited to be 0.5 or more and 0.8 or less, the reaction area of electrodes at which the electrodes come into contact with the electrolyte may be maintained while the strength of the fiber is maintained. The ratio $S_1/S_2$ is further preferably 0.55 or more and 0.75 or less and is particularly preferably 0.7 or less. The area $S_1$ of the cross section of the carbon fiber 40 is, for example, 20 $\mu m^2$ or more and 320 $\mu m^2$ or less, is further preferably 30 $\mu m^2$ or more and 300 $\mu m^2$ or less, and is particularly preferably 90 $\mu m^2$ or less.

The area $S_1$ of the cross section of the carbon fiber 40 can be measured by analyzing the cross-sectional image. In this embodiment, the ratio of the area $S_1$ of a cross section of the carbon fiber 40 to the area $S_2$ of the virtual rectangle R, that is, the area ratio $S_1/S_2$, is determined as follows. The area $S_1$ of a cross section of each of a plurality of carbon fibers is measured. The virtual rectangle R of the cross section of each of the fibers is determined, and the area $S_2$ of the virtual rectangle R is measured. The ratios $S_1/S_2$ of the fibers are calculated and averaged. The number of fibers to be measured is, for example, 3 or more and is further preferably 5 or more.

<Length of Major Axis of Fiber>

The length of the major axis of the carbon fiber 40 is 5 µm or more and 20 µm or less.

When the length of the major axis of the carbon fiber 40 (corresponds to the length b of the long side of the virtual rectangle R) is 5 µm or more, the strength of the fiber 40 can be readily maintained and a reduction in the strength of the electrodes can be limited. When the length of the major axis of the carbon fiber 40 is 20 µm or less, the fiber is thin and flexible, which reduces the likelihood of the fiber sticking into the membrane 11 (see the upper diagram of FIG. 3) included in the cell 10. When the length of the major axis of the carbon fiber 40 is 20 µm or less, the reaction area of the electrodes per unit volume is increased and the efficiency with which the electrodes react with the electrolyte is increased. The length of the major axis of the carbon fiber 40 is further preferably 15 µm or less. The length of the minor axis of the carbon fiber 40 (corresponds to the length a of the short side of the virtual rectangle R) is substantially equal to or less than the length of the major axis and is, for example, 2 µm or more and 15 µm or less.

The lengths of the minor and major axes of the carbon fiber 40 are the lengths a and b of the short and long sides of the above-described virtual rectangle R, respectively. In this embodiment, the lengths of the minor and major axes of the carbon fiber 40 are measured as follows. The virtual rectangle R of a cross section of each of a plurality of carbon fibers is determined, and the lengths a and b of the short and long sides of the virtual rectangle R are measured. The lengths a and b of the short and long sides of the virtual rectangle R are considered to be the lengths of the minor and major axes of the corresponding fiber. The average of the lengths of the minor axes of the fibers and the average of the lengths of the major axes of the fibers are calculated. The number of fibers to be measured is, for example, 3 or more and is further preferably 5 or more.

<Young's Modulus of Fibers>

The Young's modulus of the carbon fiber 40 is 20 GPa or more and 200 GPa or less.

When the Young's modulus of the carbon fiber 40 is 20 GPa or more, the fiber 40 has high flexural rigidity, which reduces the likelihood of the electrodes becoming damaged when the electrodes are deformed by compression. When the Young's modulus of the carbon fiber 40 is 200 GPa or less, the likelihood of the fiber sticking into the membrane 11 (see the upper diagram of FIG. 3) can be reduced. The Young's modulus of the carbon fiber 40 can be adjusted by changing, for example, the type of the carbon fiber and firing conditions (e.g., firing temperature) under which the raw materials, that is, organic fibers, are carbonized.

The Young's modulus of the carbon fiber 40 can be measured by, for example, subjecting carbon fibers taken from the electrodes to a tensile test.

<Preparation of Fibers>

The carbon fiber 40 is produced by carbonizing an organic fiber, such as a PAN fiber, a pitch fiber, or a rayon fiber, by firing. The carbon fiber 40 having a plurality of the pleats 41 formed in the surface thereof can be prepared by firing a modified cross-section organic fiber having a plurality of pleats formed in the surface thereof. The shape of a cross section of an organic fiber can be changed by changing the shape of the hole of a spinneret (nozzle) through which a raw-material solution is extruded into a fiber. The above-described, modified cross-section organic fiber can be prepared by forming a plurality of pleats in the surface of the fiber by using a nozzle having a plurality of irregularities formed in the inner periphery of the nozzle hole in the circumferential direction.

The electrodes (the positive electrode 14 and the negative electrode 15) according to the embodiment may have the following features.

(Thickness of Electrodes)

The thickness of the electrodes may be, for example, 0.2 mm or more and 5.0 mm or less. When the thickness of the electrodes is 0.2 mm or more, a sufficiently large reaction region (reaction field) of electrodes, in which the electrodes react with the electrolyte, can be readily maintained. When the thickness of the electrodes is 5.0 mm or less, the electrolyte can readily permeate and diffuse into the entirety of the electrodes to a sufficient degree. When the thickness of the electrodes is 2.0 mm or less, the thickness of the cell 10 (see the upper diagram of FIG. 3) can be further reduced.

The thickness of the electrodes described above is not the thickness of the electrodes that are included in the cell and in compression but the thickness of the electrodes that are not in compression, that is, in the natural state in which no external force is applied to the electrodes.

(Compression Ratio of Electrodes)

The compression ratio of the electrodes is, for example, 50% or more and 95% or less. When the compression ratio of the electrodes is 50% or more, the reaction area of the electrodes per unit volume is increased and, accordingly, the efficiency with which the electrodes react with the electrolyte is increased. When the compression ratio of the electrodes is 95% or less, voids formed in the electrodes are maintained and the circulation of the electrolyte can be facilitated at a sufficient level. When the compression ratio of the electrodes is 95% or less, the likelihood of the electrodes becoming damaged when the electrodes are excessively deformed can be reduced. The compression ratio of the electrodes is further preferably 60% or more and 85% or less. The compression ratio of the electrodes can be adjusted by changing, for example, the thickness of the electrodes and the depth of the cell spaces (the recesses 32o of the cell frame 3 illustrated in FIG. 3) in which the electrodes are housed.

The compression ratio of an electrode can be calculated by $\{(T_0-T_0/T_0)\} \times 100(\%)$, where $T_1$ is the thickness of the electrode that is in compression, and $T_0$ is the thickness of the electrode that is not in compression.

Advantages of the Embodiments

Since the electrodes according to the embodiment (the positive electrode 14 and the negative electrode 15) are formed of the carbon fiber aggregate and the carbon fiber 40 constituting the carbon fiber aggregate has a plurality of pleats 41 formed in the surface thereof, the reaction area of the electrode at which the electrodes come into contact with the electrolyte is large and, consequently, the reactivity of the electrodes with the electrolyte can be improved. In addition, since the ratio $L_1/L_2$ of the peripheral length ($L_1$) of a cross section of the carbon fiber 40 to the peripheral length ($L_2$) of a virtual rectangle R circumscribing the cross section of the carbon fiber 40 is more than 1, a sufficiently large reaction area of the electrodes, at which the electrodes come into contact with the electrolyte, can be maintained and the reactivity of the electrodes with the electrolyte is enhanced. As a result, the electrode according to the embodiment is capable of reducing the reaction resistance of electrodes and enhancing the battery performance.

The cell 10 according to an embodiment, which includes the electrodes according to the above-described embodiment, is capable of reducing the reaction resistance of electrodes and enhancing the battery performance.

The RF battery 1 according to an embodiment, which includes the cell 10 according to the above-described embodiment, is capable of reducing the reaction resistance of electrodes and enhancing the battery performance. Thus, the RF battery 1 has excellent battery performance.

Test Example 1

Carbon fiber aggregates composed of carbon fibers having different cross-sectional shapes were prepared. Single-cell RF batteries were assembled using the carbon fiber aggregates as electrodes. The RF batteries were evaluated.

In Test example 1, various types of carbon fiber aggregates (carbon felt) were prepared by working raw materials that were modified cross-section organic fibers having a plurality of pleats formed in the surfaces thereof into a felt-like form and firing the organic fibers, and a plurality of single cells (Sample Nos. 1 to 4) were prepared using the carbon fiber aggregates as electrodes. The carbon fibers that constituted the electrodes of the single cells of Sample Nos. 1 to 4 had a plurality of pleats formed in the surfaces thereof. Carbon fibers were taken from each of the electrodes and subjected to a tensile test in order to determine the Young's modulus of the carbon fibers. The carbon fibers had a Young's modulus of 30 to 150 GPa.

For comparison, carbon felt was prepared by working circular cross-section organic fibers into a felt-like form and firing the organic fibers, and a single cell (Sample No. 10) was prepared using the carbon felt as electrodes. The carbon fibers that constituted the electrodes of the single cell of Sample No. 10 had a Young's modulus of about 300 GPa.

In each of the single cell samples, carbon felt electrodes composed of the same carbon fibers were used as positive and negative electrodes, and the area of the electrodes was set to 9 cm². The thicknesses and compression ratios of the electrodes of the single cell samples were set to be substantially equal to one another. The thickness of the electrodes of the single cell samples was set to 2.0 mm. The compression ratio of the electrodes of the single cell samples was set to 60%.

<Peripheral Length Ratio, Area Ratio, and Area of Cross Section of Carbon Fibers>

A cross section of the electrodes of each of the samples was inspected with an SEM. By image analysis, the peripheral lengths $L_1$ of cross sections of three carbon fibers were measured, the peripheral lengths $L_2$ of virtual rectangles R of the cross sections of the fibers were measured, and the average of the peripheral length ratios $L_1/L_2$ of the carbon fibers constituting the electrodes was calculated. The areas $S_1$ of cross sections of the three carbon fibers were measured, the areas $S_2$ of virtual rectangles R of the cross sections of the fibers were measured, and the average of the area ratios $S_1/S_2$ of the carbon fibers constituting the electrodes was calculated. The average of the areas $S_1$ of cross sections of the carbon fibers was calculated. Table 1 summarizes the peripheral length ratio $L_1/L_2$, the area ratio $S_1/S_2$, and the area of cross section $S_1$ of the carbon fibers constituting the electrodes of each sample.

<Major Axis of Carbon Fibers>

The lengths b of the long sides of the virtual rectangles R of the cross sections of the fibers were measured and averaged to determine the length of the major axis of the carbon fibers constituting each electrode. Table 1 summarizes the length of the major axis of the carbon fibers constituting the electrodes of each sample.

<Charge-Discharge Test>

Single-cell RF batteries were each assembled using a specific one of the single cell samples and subjected to a charge-discharge test. An aqueous vanadium sulfate solution (vanadium concentration: 1.7 mol/L) was used as positive and negative electrolytes. The charge-discharge test was conducted at a current density of 70 mA/cm² under a constant-current condition. Upon the predetermined switch voltage being reached, charge and discharge were switched. The cell resistance was measured after three cycles of charge and discharge. The cell resistance was calculated by dividing the difference in intermediate voltage between charge and discharge by two, further diving the quotient by the current value to obtain a resistance value, and multiplying the resistance value with the area of the electrode. The term "intermediate voltage" used herein refers to the voltage measured at the midpoint between the start and end of charge or discharge.

<Reaction Resistance of Electrodes>

The reaction resistance of the electrodes was determined from the cell resistance measured using each of the single-cell battery samples. The reaction resistance was considered to be the cell resistance minus the conduction resistance and calculated using the following formula. The conduction resistance was measured using a BATTERY HiTESTER. Table 1 summarizes the reaction resistance of the electrodes of each sample.

Reaction resistance ($\Omega\cdot cm^2$)=Cell resistance ($\Omega\cdot cm^2$)–Conduction resistance ($\Omega\cdot cm^2$)

TABLE 1

| Sample No. | Carbon fiber | | | | Electrodes Reaction resistance ($\Omega \cdot cm^2$) |
| | Peripheral length ratio $L_1/L_2$ | Area ratio $S_1/S_2$ | Area of cross section $S_1$ (μm²) | Length of major axis (μm) | |
| --- | --- | --- | --- | --- | --- |
| 1 | 1.06 | 0.72 | 76 | 11 | 0.25 |
| 2 | 1.15 | 0.59 | 53 | 12 | 0.24 |
| 3 | 1.33 | 0.68 | 37 | 11 | 0.24 |
| 4 | 1.45 | 0.77 | 55 | 10 | 0.25 |
| 10 | 0.79 | 0.79 | 95 | 11 | 0.31 |

The results shown in Table 1 confirm that Sample Nos. 1 to 4, in which the peripheral length ratio $L_1/L_2$ of carbon fibers constituting the electrodes was more than 1, had a smaller reaction resistance than Sample No. 10. That is, the reaction resistance of the electrodes of each of Sample Nos. 1 to 4 was reduced. Thus, when the peripheral length ratio $L_1/L_2$ of the carbon fibers is more than 1, the reaction resistance of electrodes can be reduced and the battery performance of an RF battery can be enhanced.

REFERENCE SIGNS LIST

1 REDOX FLOW BATTERY (RF BATTERY)
2 CELL STACK
10 REDOX FLOW BATTERY CELL (CELL)
11 MEMBRANE
12 POSITIVE ELECTRODE CELL 13 NEGATIVE ELECTRODE CELL
14 POSITIVE ELECTRODE 15 NEGATIVE ELECTRODE
3 CELL FRAME
31 BIPOLAR PLATE 32 FRAME BODY
32o RECESS
33, 34 LIQUID-SUPPLY MANIFOLD 35, 36 LIQUID-DISCHARGE MANIFOLD
33s, 34s LIQUID-SUPPLY SLIT 35s, 36s LIQUID-DISCHARGE SLIT
37 SEALING MEMBER
40 CARBON FIBER 41 PLEATS
R VIRTUAL RECTANGLE
100 1P POSITIVE ELECTROLYTE CIRCULATION CHANNEL 100N NEGATIVE ELECTROLYTE CIRCULATION CHANNEL
106 POSITIVE ELECTROLYTE TANK 107 NEGATIVE ELECTROLYTE TANK
108, 109 SUPPLY PIPE 110, 111 RETURN PIPE
112, 113 PUMP
200 SUBSTACK
210 SUPPLY AND DISCHARGE PLATE 220 END PLATE 230 CLAMPING MECHANISM
C ALTERNATING CURRENT/DIRECT CURRENT CONVERTER P POWER SYSTEM

The invention claimed is:

1. An electrode for redox flow batteries, the electrode being formed of a carbon fiber aggregate including a plurality of carbon fibers,
   each of the carbon fibers having a plurality of pleats formed in the surface thereof,
   the ratio of $L_1$ to $L_2$, that is, $L_1/L_2$, being more than 1, where $L_1$ is the peripheral length of a cross section of the carbon fibers and $L_2$ is the peripheral length of a virtual rectangle circumscribing the cross section of the carbon fibers.

2. The electrode for redox flow batteries according to claim 1, wherein the ratio of $S_1$ to $S_2$, that is, $S_1/S_2$, is 0.5 or more and 0.8 or less, where $S_1$ is the area of a cross section of the carbon fibers and $S_2$ is the area of a virtual rectangle circumscribing the cross section of the carbon fibers.

3. The electrode for redox flow batteries according to claim 1, wherein the length of the major axis of the carbon fibers is 5 μm or more and 20 μm or less.

4. The electrode for redox flow batteries according to claim 1, wherein the carbon fibers have a Young's modulus of 20 GPa or more and 200 GPa or less.

5. The electrode for redox flow batteries according to claim 1, wherein the carbon fiber aggregate is carbon felt or carbon cloth.

6. A redox flow battery cell comprising the electrode for redox flow batteries according to claim 1.

7. A redox flow battery comprising the redox flow battery cell according to claim 1.

* * * * *